United States Patent Office 3,228,921
Patented Jan. 11, 1966

3,228,921
PROCESS FOR PREPARING COPOLYMERS OF HIGH MOLECULAR WEIGHT FROM ALPHA-OLEFINS
Albert G. M. Gumboldt, Frankfurt am Main, Gerhard Schleitzer, Hofheim, Taunus, and Erich Schmidt, Schonberg, Taunus, Germany, assignors to Farbwerke Hoechst Aktiengesellschaft vormals Meister Lucius & Brüning, Frankfurt am Main, Germany, a corporation of Germany
No Drawing. Filed Aug. 2, 1960, Ser. No. 46,909
Claims priority, application Germany, Aug. 7, 1959, F 29,121
1 Claim. (Cl. 260—88.2)

The present invention relates to a process for preparing copolymers of high molecular weight.

It has already been proposed to produce copolymers of high molecular weight from alpha-olefins with the use of mixed organo-metal catalysts prepared by reacting esters or acetyl-acetonates of the elements of subgroups IV to VIII of the Periodic Table (according to Mendeleeff) with organo-metal compounds of the elements of main groups I to III of the Mendeleeff Periodic Table.

In the above mentioned process the mixed organo-metal catalysts are obtained, inter alia, by reacting acetyl-acetonates of vanadium with aluminum-alkyls and/or alkyl-aluminum halides.

It has now been found that for preparing mixed organo-metal catalysts suitable for the manufacture of substantially or exclusively amorphous copolymers of alpha-olefins there can be used, chelate complex compounds of vanadium with 1,3-dioxo compounds, capable of being enolized, of the following formula $$R^1-\underset{\underset{O}{\|}}{C}-CH_2-\underset{\underset{O}{\|}}{C}-R^2$$

wherein $R^1$ and $R^2$ represent unsubstituted or substituted alkyl or aryl radicals containing 1 to 12 carbon atoms, in combination with organo-metal compounds of the elements of main groups I to III of the Mendeleeff Periodic Table.

For the preparation of the heavy metal component of the mixed catalysts according to the invention are especially suitable chelate complex compounds of tri-, tetra-, or pentavalent vanadium. As enolizable 1,3-dioxo compounds for the complex formation can be used, for example, benzoyl-acetone, dibenzoyl-methane, furfuroyl-benzoyl-methane

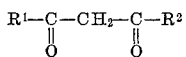

or acetyl-cyclopentanone-1

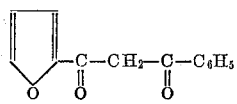

In the complex compound not only the 1,3-dioxo compound alone but also halogen atoms and/or oxygen atoms can be bound to the vanadium, that is to say compounds of the type tribenzoyl-acetone-vanadium-III as well as di-benzoyl-acetone-vanadium - V-hydroxy-monochloride, mono-benzoyl-acetone-vanadium-V-hydroxy dichloride or di-benzoyl-acetone-vanadium oxide can be employed.

Furthermore there can be used vanadium chelate complex compounds in which the 1,3-dioxo component contains, in addition to the two dioxo groups, other functional groups which do not react with the organo-metal compounds. In the above mentioned formula $R^1$ and/or $R^2$ can stand for alkoxy or aryloxy radicals in which the oxygen can be replaced by sulfur or substituted nitrogen atoms. Vanadium chelate complex compounds containing functional groups of this kind are obtained, for example, by reacting vanadium halides with acetoacetic alkyl or aryl esters.

A considerable advantage of the present invention resides in the fact that the vanadium chelate complex compounds need not only be used in substance as catalyst components. It is sufficient to dissolve the 1,3-dioxo component, for example benzoyl-acetone or acetoacetic ester, in an inert organic solvent, such as benzene or toluene, and to add to that solution the amount of vanadium halide, especially $VOCl_3$ or $VCl_4$, required for the formation of the desired chelate complex compound. The hydrochloric acid formed is expelled in simple manner with nitrogen.

The solution of the internal vanadium complex compound thus obtained is then dropped into the polymerization medium together with the second component of the mixed catalyst according to the invention, namely the organo-metal compound such as amyl-lithium or alkyl-aluminum compounds that may contain halogen and preferably chlorine, for example trialkyl-aluminum, dialkyl-aluminum monochloride, monoalkyl-aluminum dichloride, or mixtures of said compounds, wherein the alkyl radical generally contains 1–8 carbon atoms and represents for example the methyl, ethyl, propyl, butyl, pentyl, hexyl, heptyl or octyl group. It is likewise possible, of course, first to dissolve one component of the mixed catalyst in the polymerization medium together with the alpha-olefin and then to drop in the other component.

The catalysts according to the invention are very active. The proportion of vanadium compound to aluminum compound is preferably within the range of 1:2 to 1:4. However, the excess of aluminum may also be greater than that, the proportion of vanadium to aluminum may be up to 1:15.

Copolymers containing the starting substances in definite percentages can be obtained by mixing the olefins in corresponding molar proportions and then introducing them into the polymerization medium at the same rate as these substances are consumed. From the beginning of the polymerization the organic solvent serving as polymerization medium has to be saturated with a corresponding suitable mixture of the olefin monomers, owing to the different speed of polymerization of the different olefins. The amorphous copolymers which are thus obtained and which are dissolved in the reaction medium are freed by appropriate measures, for example, by stirring with water and by subsequent steam distillation, from the portions of catalyst adhering to them and from the organic solvent.

As monomers for the preparation of copolymers having the properties of elastomers there may be used mixtures of two or more alpha-olefins, for example ethylene, propylene, butene-(1), pentene-(1), and hexene-(1), or mixtures of one or more of these alpha-olefins with one or more branched alpha-olefins, for example 4-methyl-pentene-(1), 5,5-dimethyl-hexene-(1), 3-methyl-pentene-(1), 3-ethyl-hexene-(1), or mixtures of one or more of the aforesaid monomers with one or more aromatic olefin derivatives, for example styrene, allyl benzene, 4-phenyl-butene-(1), as well as mixtures of one or more of the aforesaid alpha-olefins with one or more dienes which possess conjugated or isolated double bonds, for example 1,3-butadiene, isoprene, 1,4-pentadiene and 1,5-hexadiene.

The following examples serve to illustrate the invention but they are not intended to limit it thereto.

EXAMPLE 1

3.9 liters of dry toluene were saturated with a gas mixture consisting of 3 parts by volume of ethylene and 10 parts by volume of propylene and 1.24 cc. (10 millimols) of diethyl-aluminum monochloride were added at 30° C. Subsequently a solution of 1.95 grams (5 millimols) of dibenzoyl-acetone-vanadium-IV oxide in 300 cc. of toluene and simultaneously a solution of 2.48 cc. (20 millimols) of diethyl-aluminum monochloride in 300 cc. of toluene were dropped into the polymerization medium in the course of 100 minutes. As soon as the polymerization set in, ethylene and propylene were introduced in a proportion by volume of 2:1. The gas supply was regulated in a manner such that no superatmospheric pressure was produced in the apparatus. After a total polymerization period of 2 hours, the reaction was interrupted by the addition of water. The polymerization mixture was stirred 5 times at 70° C., each time with 1 liter of water, the toluene was eliminated wtih steam, the comminuted polymerization cake was extracted with acetone and then dried at 60–70° C. under a pressure of 200 mm. of mercury until the weight was constant. 195 grams of a copolymer were obtained having a reduced specific viscosity of 3.3, determined with a 0.1% decahydronaphthalene solution at 135° C. According to infra-red spectroscopic analysis the product was composed of 62 mol percent of ethylene and of 38 mol percent of propylene.

Vulcanization

On a mixing roller at a roller temperature of about 50–60° C. 50 parts by weight of carbon black (HAF Russ), 3 parts by weight of dicumyl peroxide, 0.3 part by weight of zinc stearate and 0.3 part by weight (0.01 mol) of sulfur were mixed into 100 parts by weight of the copolymer obtained as described above. In a vulcanization in stages test flaps having a thickness of 4 mm. were prepared, the press having a temperature of 160° C.

The following table gives the values that were measured at the standard rings according to DIN specifications or at the test flaps:

| | |
|---|---|
| Defo hardness | 900 |
| Defo elasticity | 27 |
| Elongation at break, percent at 20° C. | 420 |
| Tensile strength, kg./cm.$^2$ at 20° C. | 185 |
| Modulus, 100% at 20° C. | 19 |
| Modulus, 300% at 20° C. | 105 |
| Permanent elongation percent at 20° C. (measured 1 minute after tearing) | 10 |
| Resilience, percent at 20° C. | 40 |
| Shore hardness | 64 |

EXAMPLE 2

1.8 liters of dry toluene (distilled over sodium) were saturated with a gas mixture consisting of 3 parts by volume of ethylene and 10 parts by volume of propylene and then 0.45 cc. (2 millimols) of ethyl-aluminum sesquichloride was added at 30° C. Immediately thereafter 100 cc. of toluene which, after the addition of 0.19 cc. (2 millimols) of vanadium oxytrichloride and 0.33 gram (2 millimols) dibenzoyl-acetone, had been scavenged with nitrogen for 30 minutes, and simultaneously a solution of 0.9 cc. (4 millimols) of ethyl-aluminum sesquichloride in 100 cc. of toluene were dropped into the polymerization medium in the course of 100 minutes. As soon as the polymerization set in ethylene and propylene were introduced in a proportion by volume of 2:1. The gas supply was regulated in a manner such that no superatmospheric pressure was produced in the apparatus. After a total polymerization period of 2 hours the reaction was interrupted and the polymer was worked up as described in Example 1. 120 grams of a copolymer were obtained having a reduced specific viscosity of 2.8, determined at 135° C. with a 0.1% decahydronaphthalene solution. According to infrared spectroscopic analysis the product was composed of 70 mol percent of ethylene and 30 mol percent of propylene.

After having been vulcanized as described in Example 1 the product had the following values:

| | |
|---|---|
| Defo hardness | 650 |
| Defo elasticity | 11 |
| Elongation at break, percent at 20° C. | 455 |
| Tensile strength, kg./cm.$^2$ at 20° C. | 190 |
| Modulus, 100% at 20° C. | 19 |
| Modulus, 300% at 20° C. | 145 |
| Permanent elongaiton, percent at 20° C. (measured 1 minute after tearing) | 10 |
| Resilience, percent at 20° C. | 42 |
| Shore hardness A | 65 |

EXAMPLE 3

Ethylene was copolymerized with propylene under the conditions indicated in Example 2, with the exception that 0.5 cc. (4 millimols) of diethyl-aluminum chloride was first introduced into the polymerization medium instead of ethyl-aluminum sesquichloride and that the following catalyst components were used: 1.07 grams of tribenzoyl-acetone vanadium-III dissolved in 100 cc. of toluene, and 0.99 cc. (8 millimols) of diethyl-aluminum monochloride likewise dissolved in 100 cc. of toluene. The polymer was worked up as described in Example 2. About 72 grams of copolymer were obtained having a reduced specific viscosity of 3.1, determined at 135° C. with a 0.1% solution in decahydronaphthalene. According to infrared spectroscopic analysis the product was composed of 65 mol percent of ethylene and 35 mol percent of propylene.

EXAMPLE 4

Ethylene was copolymerized with propylene as described in Example 3. 0.5 cc. (4 millimols) of diethyl-aluminum chloride was added to the polymerization medium (1.8 liters of toluene). As catalyst components there were separately dropped into the polymerization medium within 100 minutes 0.26 cc. (2 millimols) of acetoacetic acid ethyl ester and 0.19 cc. (2 millimols) of VOCl$_3$, dissolved in 100 cc. of toluene, and subsequently rinsed for 30 minutes with nitrogen, and a solution of 0.99 cc. (8 millimols) of diethyl-aluminum chloride in 100 cc. of toluene. The reaction product was worked up as described in Example 3. 63 grams of a copolymer were obtained having a reduced specific viscosity of 2, determined at 135° C. with a 0.1% decahydronaphthalene solution. According to infrared spectroscopic analysis the product was composed of 67.5 mol percent of C$_2$ units and 32.5 mol percent of C$_3$ units.

EXAMPLE 5

Ethylene was copolymerized with propylene as described in Example 3. 0.41 cc. (4 millimols) of ethyl-aluminum dichloride was added at 30° C. to 1800 cc. of benzine (boiling range 60–95° C.). The polymerization batch was then admixed dropwise within 100 minutes with 0.26 cc. (2 millimols) of acetoacetic acid ethyl ester and 0.19 cc. (2 millimols) of VOCl$_3$, dissolved in 100 cc. of toluene and subsequently scavenged with nitrogen for 30 minutes, and a second solution containing in 100 cc. of toluene 0.81 cc. (8 millimols) of ethyl-aluminum dichloride. The reaction product was worked up as described in Example 3. 125 grams of a copolymer were obtained having a reduced specific viscosity of 3.3, determined at 135° C. with a 0.1% decahydronaphthalene solution. The product was composed of 69 mol percent of ethylene and 31 mol percent of propylene.

EXAMPLE 6

Ethylene was copolymerized with propylene as described in Example 3. 0.41 cc. (4 millimols) of ethyl-aluminum dichloride was added at 30° C. to 1,800 cc. of benzine (boiling range 60–95° C.). Then 100 cc. of toluene which, after the addition of 0.19 cc. (2 millimols) of VOCl$_3$ and 0.33 gram (2 millimols) benzoyl-acetone, had been scavenged for 30 minutes with nitrogen, and simultaneously a solution of 0.81 cc. (8 millimols) of ethylaluminum dichloride in 100 cc. of toluene were dropped into the polymerization batch in the course of 100 minutes. The reaction product was worked up as described in Example 3. 130 grams of a copolymer were obtained having a reduced specific viscosity of 2.9, determined at 135° C. with a 0.1% decahydronaphthalene solution. According to infrared spectroscopic analysis the product was composed of 66 mol percent of ethylene and 34 mol percent of propylene.

We claim:

A process for preparing a substantially amorphous copolymer of ethylene and propylene, which comprises copolymerizing ethylene and propylene in an inert organic solvent, using as a catalyst the product obtained by reacting (1) the chelate complex compound of vanadium oxy trichloride and benzoyl-acetone and (2) ethyl aluminum dichloride, and maintaining the ratio of ethylene to propylene dissolved in said solvents constant throughout the copolymerization reaction.

References Cited by the Examiner

UNITED STATES PATENTS

| | | | |
|---|---|---|---|
| 2,846,427 | 8/1958 | Findlay | 260—94.9 |
| 2,921,056 | 1/1960 | Stuart | 260—88.2 |
| 2,929,808 | 3/1960 | Ross et al. | 260—88.2 |
| 2,965,626 | 12/1960 | Pilar et al. | 260—88.2 |

FOREIGN PATENTS 553,655 6/1957 Belgium.

OTHER REFERENCES

Billmeyer, Textbook of Polymer Chemistry (1957), Interscience Publishers Inc., New York, page 239.

JOSEPH L. SCHOFER, *Primary Examiner.*

L. H. GASTON, *Examiner.*